Dec. 15, 1942.  J. H. O'NEIL  2,305,102
APPARATUS FOR DETECTING AND REJECTING SLACK FILLED CONTAINERS
Filed Jan. 2, 1940  3 Sheets-Sheet 1
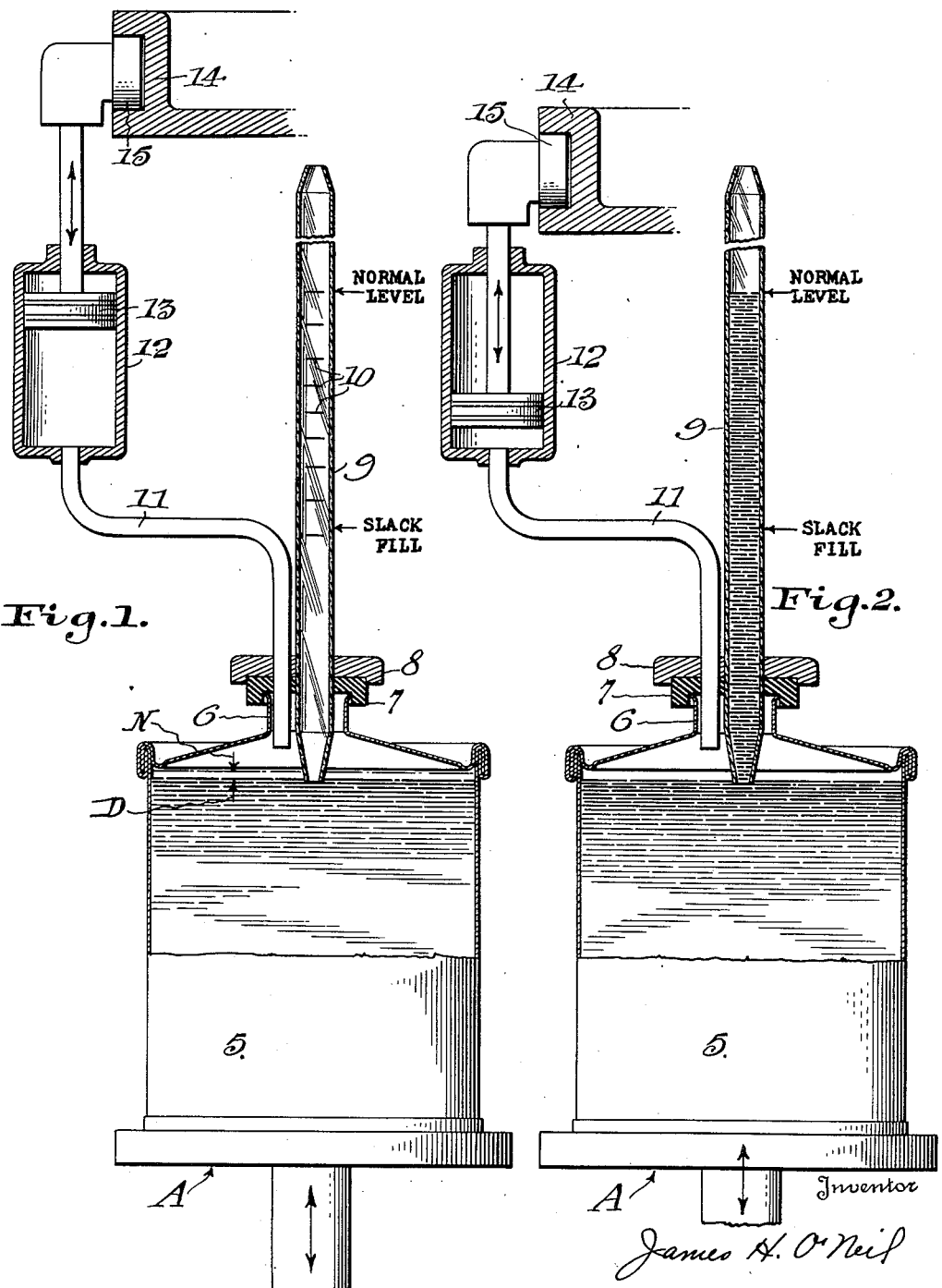

Dec. 15, 1942.  J. H. O'NEIL  2,305,102
APPARATUS FOR DETECTING AND REJECTING SLACK FILLED CONTAINERS
Filed Jan. 2, 1940  3 Sheets-Sheet 2
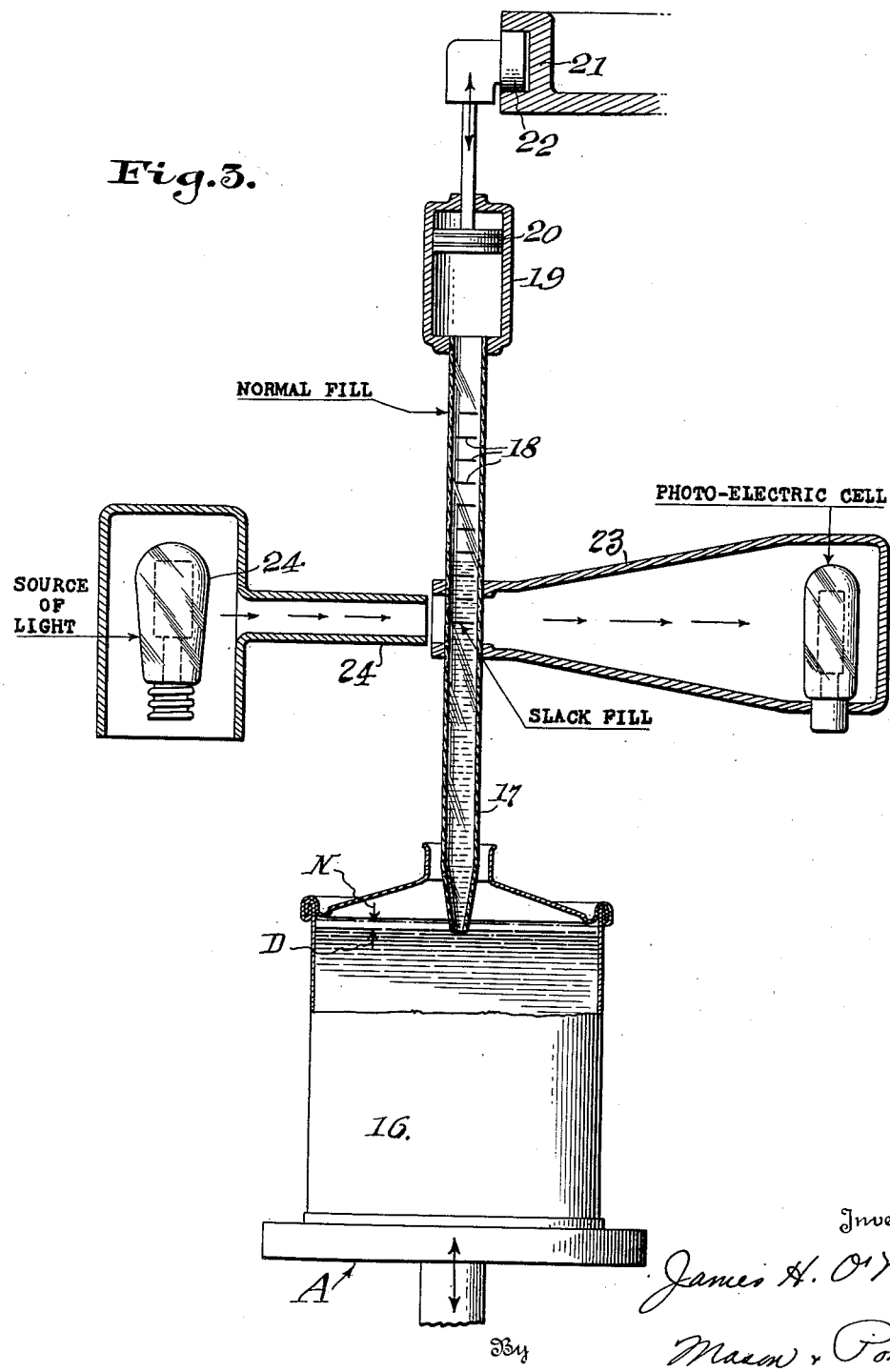

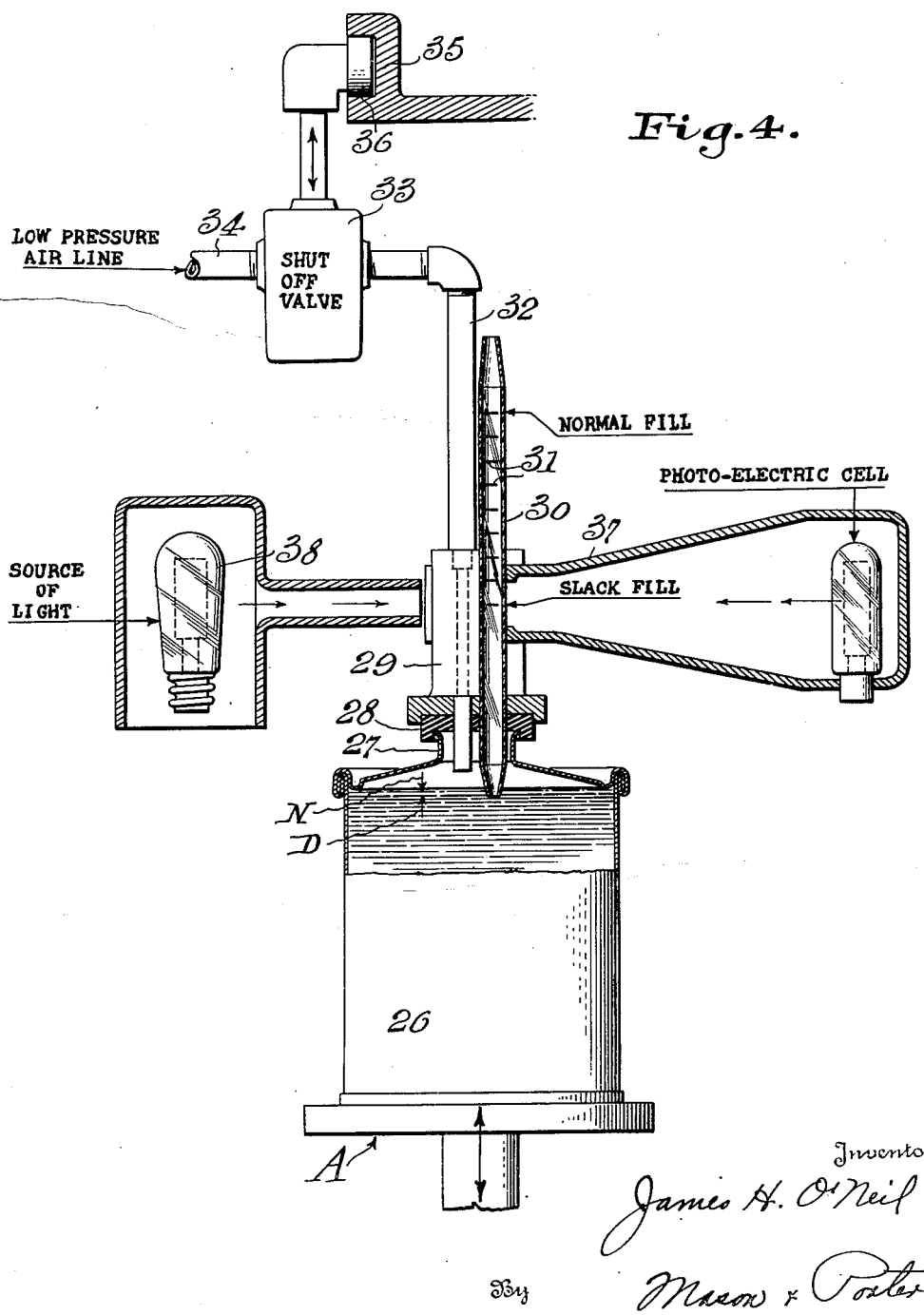

Patented Dec. 15, 1942

2,305,102

UNITED STATES PATENT OFFICE 2,305,102

APPARATUS FOR DETECTING AND REJECTING SLACK FILLED CONTAINERS

James H. O'Neil, Syracuse, N. Y., assignor to Continental Can Company, Inc., New York, N. Y., a corporation of New York Application January 2, 1940, Serial No. 312,183

5 Claims. (Cl. 73—51)

This invention relates to new and useful improvements in testing equipment, and primarily seeks to provide a novel means for testing or determining the level of liquids in packaging containers.

At the present time automatic filling machines are widely used to rapidly effect the filling of containers presented to the machine. Such machines are generally provided with means for adjusting or regulating the flow of liquid entering the containers in order to assure the injection of a substantially uniform volume of liquid into each container. It sometimes happens that, in spite of the volumetric adjustments mentioned, slight variations in the volume of liquid received by the containers do occur and result in the provision of numerous overfilled and underfilled containers. It, therefore, becomes desirable to provide a means whereby the liquid level in the containers can be ascertained automatically, and any containers having a subnormal or slack fill can be automatically rejected.

Therefore, an object of the invention is to provide a means for determining the level of liquids in containers which includes inserting a graduated indicator tube or liquid column confining medium into a container until its lower end is disposed a predetermined distance below the level of correct fill, then forcing liquid from said container into the tube through the medium of differential pressures to thereby provide visual indication of the liquid level in the container.

Another object of the invention is to provide a means of the character stated in which the indicator tube and container are disposed in air-seal relation and fluid pressure is applied within said container to thereby force liquid into the indicator tube to thereby provide the desired liquid level indication.

Another object of the invention is to provide a means of the character stated in which the container remains open to atmospheric pressure after the indicator tube is inserted therein and a partial vacuum is drawn on the upper end of said indicator tube to thereby force liquid into the indicator tube to thereby provide the desired liquid level indication.

Another object of the invention is to provide a means of determining the level of liquids in containers and automatically rejecting all containers found to include a slack fill.

Another object of the invention is to provide a means of the character stated which includes inserting an indicator tube into a container until its lower end is disposed a predetermined distance below the level of correct fill, disposing said tube intermediate a source of light and a light sensitive ejector-actuating device, then forcing liquid from said container into the tube through the medium of differential pressures to thereby either interrupt the light beam between said light source and said light sensitive device to maintain the ejector means inoperative, or fail to interrupt said light beam and indicate that the liquid level in said container is subnormal and to effect actuation of the ejecting means.

Another object of the invention is to provide a means of the character stated which effects control of filled containers to prevent the passing of subnormally filled containers without detection and rejection or ejection.

Another object of the invention is to provide novel apparatus for determining the level of liquids in containers which includes a transparent indicator tube insertable into a container and projecting thereabove, means for disposing the lower end of the tube a definite and predetermined distance below the line of normal fill, and means for effecting a pressure differential between the surface of the liquid in the container and the top of the tube to thereby force a column of liquid into said tube for liquid level or state of fill indicating purposes.

Another object of the invention is to provide apparatus of the character described which includes light sensitive means arranged to detect the presence of a column of liquid in the indicator tube.

With these and other objects in view which will more fully appear, the nature of the invention will be more clearly understood by following the description, the appended claims, and the several views illustrated in the accompanying drawings.

In the drawings—

Figure 1 is a somewhat diagrammatic illustration of the apparatus which may be employed when the indicator tube and container are disposed in air-seal relation in carrying out the method of this invention.

Figure 2 is a similar view, but showing liquid forced up into the indicator tube.

Figure 3 is a somewhat diagrammatic illustration of the apparatus which may be employed when the method of this invention includes the step of liquid level detection in the tube by photo-electric means, and when the liquid within the container is open to atmospheric pressure.

Figure 4 is a similar view of a slightly modified form of apparatus which may be employed in the execution of the method of the invention when the indicator tube and container are disposed in air-seal relation.

In order that the method embodied in the invention may be clearly understood, a hypothetical example will be described to illustrate the principle involved in the determination of the level of liquids in containers particularly those having opaque side walls through which it is impossible to observe liquid level. It will be assumed that a container having an internal diameter of six inches has been filled. This container may be considered slack or subnormally filled when the liquid level therein is 1/16 inch below the normal (or correct) fill line. The volume of 1/16 inch of liquid in a container of this diameter is approximately 1.8 cubic inches. This same volume of liquid if placed in a 3/4 inch diameter tube would stand four inches high. Therefore, if the lower end of a 3/4 inch tube were immersed in the liquid in the container, and if the level of the liquid in the container were lowered 1/16 inch by external pressure and thus forced into the tube, the liquid level in the tube would be four inches above the liquid level in the container. Likewise, if the liquid level in the container were lowered 1/8 inch, the liquid level in the tube would be eight inches above that in the container.

A method of grading liquid filled containers to prevent shipping of subnormally or slack filled containers and which utilizes the above described principle of operation consists in first bringing a liquid filled container into operative or testing relation to an indicator tube or liquid column confining means in such a manner that the lower end of the tube will be disposed a slight distance below the level of normal fill; then effecting a pressure differential between the surface of the liquid in the container and the upper end of the indicator tube to thereby force a column of liquid into said tube to indicate the status of the fill; then releasing said pressure differential to allow the liquid column to return to the container, and finally moving said container and said indicator tube out of testing relationship.

One form of apparatus which may be used in a practical application of the method just described is somewhat diagrammatically illustrated in Figs. 1 and 2 of the drawings.

In the particular embodiment illustrated in the above referred to figures, a container 5, having a neck portion 6, is adapted to be moved into air-seal relation to a resilient sealing gasket 7 by a vertically reciprocable positioning table A. The gasket 7 is carried by a mounting element 8 which may form part of a standard, not shown.

A vertically disposed and open-ended indicating tube 9 having graduated markings 10 formed thereon extends through the element 8 and the gasket 7 with its lower end disposed a predetermined distance below the lower face of the gasket. An air pressure pipe 11 has one end disposed adjacent the indicator tube 9 and projecting below the gasket 7 a slight distance, and its other end connected to the discharge side of a pump 12 having a reciprocating piston 13 mounted therein and adapted to be driven through the medium of suitable cam and follower equipments diagrammatically indicated at 14, 15.

In operation, the table A raises the container 5 into testing position so that the neck 6 thereof engages the lower face of the gasket 7 in air-seal relation, the lower ends of the indicator tube 9 and the pressure pipe 11 projecting into the container, with the lower end of the tube 9 being disposed a predetermined distance D below the line of normal fill level N in the container. See Fig. 1. It should be understood that the volumetric displacement of a single stroke of the piston 13 of the pump 12 is equal to the volume of liquid in the container defined by the line of fill at the bottom of the tube 9 and the line of normal fill in order that the testing may be effected in accordance with the principle hereinbefore mentioned.

After the container has been brought into air-seal relation to the gasket 7, the pump is actuated and forces air into the upper portion of the container. The liquid level in the container is thereby lowered and the displaced liquid is forced up into the indicator tube 9 as illustrated in Fig. 2 of the drawings. The graduations 10 on the tube are so arranged as to indicate a range of values of the liquid column in the tube within which the level of fill is considered satisfactory. If the height of the liquid column in the tube fails to reach the lower limit of the range of graduations, it will indicate that the can is subnormally or slack filled and must be rejected. It will be obvious that should the level of liquid in the container be so low that the tube 9 will not engage in liquid seal relation with it, no liquid will be forced up into the tube by application of pressure upon the liquid in the container.

Another form of apparatus by which the principle herein described may be utilized practically is illustrated in Fig. 3 of the drawings. In this particular embodiment a container 16 is adapted to be brought into testing position by the table A. A vertically disposed indicating tube 17 having graduated markings 18 formed thereon, has its lower end extending into the container and disposed a predetermined distance below the level or line of normal fill. The upper end of the tube 17 is connected to the intake side of a suction pump 19 having a reciprocating piston 20 mounted therein and adapted to be driven through the medium of suitable cam and follower connections 21, 22.

Any suitable supporting structure, not shown, carries a housing 23 extending laterally to either side of the tube 17. One end of the housing 23 is provided with a light source 24, and the other end with a photo-electric cell as indicated in Figure 3. The light source and photo-electric cell are so arranged that the light beam extending between the two passes through a portion of the indicator tube 17.

In operation, the table A raises the can 16 into testing position relative to the tube 17 so that the lower end of the tube is located within the container and disposed a predetermined distance below the line of normal fill. It should be noted that the liquid in the can 16 is open to atmospheric pressure. Then the pump 19 is actuated through the medium of the cam and follower connections 21, 22, to thereby reduce the pressure in the upper end of the tube whereby a portion of the liquid will be forced up into the tube by the pressure differential between the top of the tube and the surface of the liquid. The volumetric displacement of the travel of the piston 20 bears the same relation to the volume of liquid from the line of normal fill to the level of the tube bottom as the piston displacement of the pump 12 bore to a similar volume in the container 5 as previously described. The graduations 18 on the tube are so arranged as to indicate a range of values of the liquid column within which the level of fill is considered satisfactory.

The housing 23 is so disposed that the light beam between the light source and the photoelectric cell normally projects through the tube at a point near the lower end of the range of graduations 18. The electrical circuit (not shown) affecting the light source and the photoelectric cell, may be formed in such a manner, and in such timed relation to the testing of successively filled containers, that if the liquid column in the tube 17 interrupts the beam of light a signal or other device will be actuated to indicate that the can is satisfactorily filled; or if the liquid column in the tube fails to interrupt the light beam, a signal will be actuated to indicate that the level of fill is not satisfactory, or some form of ejecting means will be actuated to reject that particular container after the container has been lowered to the disengaged or non-testing position.

Another form of apparatus embodying the principle of the invention and which may be used to detect improperly filled cans, is somewhat diagrammatically illustrated in Fig. 4 of the drawings. This form of apparatus is generally similar to that disclosed in Figs. 1 and 2 of the drawings, but includes certain additional or modified features. A container 26 having a neck portion 27 is adapted to be moved into air-seal relation to a resilient sealing gasket 28 by the positioning table A. The gasket 28 is carried by a mounting element 29 which forms part of a standard, not shown.

A vertically disposed and open-ended indicating tube 30 having graduated markings 31 formed thereon extends through the element 29 and gasket 28 with its lower end disposed a predetermined distance below the lower face of the gasket. An air pressure pipe 32 has one end disposed adjacent the indicator tube 30 and projecting below the gasket 28, and its other end connected to the outlet side of a shut-off valve 33 adapted to be controlled through the medium of cam and follower connections 35, 36. The inlet side of the shut-off valve is connected to a source of constant low pressure air through the medium of a pipe 34.

In operation for determining the status of fill in a can, the table A raises the container 26 into testing position so that the neck 27 thereof engages the lower face of the gasket 28 in air-seal relation, the lower ends of the indicator tube 30 and pressure pipe 32 projecting into the container with the bottom of the tube 30 disposed a predetermined distance below the line of normal fill in the can. Then the shut-oil valve 33 is actuated by the cam and follower connections 35, 36 to permit a volume of low pressure air that is equal to the volume of liquid in the container between the line of normal fill and the plane of the bottom of the tube 30 to enter the can. The liquid level in the container is thereby lowered and the displaced liquid is forced up into the indicator tube 30.

The standard portion 29 carries a housing 37 extending to each side of and in line with the indicator tube. One end of the housing is provided with a light source 38 and the other end with a photo-electric cell so disposed as indicated in Figure 4, that the light beam from the source 38 passes through the indicator tube on its way to the photo-electric cell. The electrical circuit for the light source and photo-electric cell may be arranged to function in the same manner as that used in conjunction with the form of apparatus disclosed in Fig. 3. Thus if the liquid column in the tube 30 interrupts the light beam in the housing, a signal or other device may be actuated to indicate that the container is properly filled, or the can may be permitted to pass on to the closing machine without such signal. However, if the liquid column fails to interrupt the light beam, a signal may be actuated to show that the container is improperly filled and a suitable ejecting means can be actuated to reject that particular container as unsatisfactorily filled after the container has been lowered to the non-testing position by the table A.

It will be observed that each of the three forms of apparatus described herein utilizes the principle of employing differential pressures to effect a rise of liquid in an indicator tube in order to ascertain the status, as differentiated from the actual total volume, of fill in an opaque container so that improperly filled containers may be rejected.

In the two forms of apparatus indicated which employ photo-electric cells, it will be observed that the photo-electric means included therewith actually scan or read the height of the liquid column in the indicator tubes within a certain range of values as a means of automatic indication or control of the containers during inspection.

It is of course to be understood that the details of structure and arrangement of parts may be variously changed and modified without departing from the spirit and scope of my invention.

I claim:

1. In apparatus for determining the level of liquids in opaque containers, a vertically disposed open-ended indicator tube, means for positioning said tube in a container with its lower end disposed a predetermined distance below the level of normal fill in said container, and means for creating a pressure differential between the surface of the liquid in said container and the top of said tube to displace a volume of air which is substantially equal to the volume of liquid between the level of normal fill and the bottom of the tube, said tube being of a capacity to retain the aforesaid volume of liquid whereby through the aforesaid pressure differential a column of liquid of predetermined height will be forced into said tube to indicate a status of acceptable fill or a state of slack fill will be evidenced by failure of the liquid to rise in the tube to said predetermined height.

2. In apparatus for determining the level of liquids in opaque containers, a vertically disposed open-ended indicator tube, means for positioning said tube in a container with its lower end disposed a predetermined distance below the level of normal fill and including devices for sealing the container from the atmosphere, and means for creating a pressure differential between the surface of the liquid in said container and the top of said tube through the medium of a displacement of a volume of air which is substantially equal to the volume of liquid between the level of normal fill and the bottom of the tube, said tube being of a capacity to retain the aforesaid volume of liquid whereby through the aforesaid pressure differential a column of liquid of predetermined height will be forced into said tube to indicate a status of acceptable fill, or a state of slack fill will be evidenced by failure of the liquid to rise in the tube to said predetermined height.

3. In apparatus for determining the level of liquids in opaque containers, a vertically disposed open-ended indicator tube, means for positioning said tube in a container with its lower end disposed a predetermined distance below the level of normal fill and including devices for sealing the container from the atmosphere, and means for forcing a volume of air into said container substantially equal to the volume of liquid in the container between the level of normal fill and the bottom of said indicator tube, said tube being of a capacity to retain the aforesaid volume of liquid, the aforesaid forcing of the volume of air into the container functioning to create a pressure differential between the surface of the liquid in said container and the top of said tube whereby a column of liquid of predetermined height will be forced into said tube to indicate a status of acceptable fill, or a state of slack fill will be evidenced by failure of the liquid to rise in the tube to said predetermined height 4. In apparatus for determining the level of liquids in opaque containers, a vertically disposed open-ended indicator tube, means for positioning said tube in a container with its lower end disposed a predetermined distance below the level of normal fill in said container, means for withdrawing a definite volume of air from the upper end of said tube to create a pressure differential between the surface of the liquid in said container and the top of said tube to displace a volume of air which is substantially equal to the volume of liquid between the level of normal fill and the bottom of the tube, said tube being of a capacity to retain the aforesaid volume of liquid whereby through the aforesaid pressure differential a column of liquid of predetermined definite height, will be forced into said tube to indicate a status of acceptable fill, or a state of slack fill will be evidenced by failure of the liquid to rise in the tube to said predetermined height, and light sensitive means disposed in cooperative relation to said tube for detecting the presence of a column of liquid in said tube and controlling subsequent handling of said container.

5. In apparatus for determining the level of liquids in opaque containers, a vertically disposed open-ended indicator tube, means for positioning said tube in a container with its lower end disposed a predetermined distance below the level of normal fill and including devices for sealing the container from the atmosphere, means for forcing a definite volume of air into said container to create a pressure differential between the surface of the liquid in said container and the top of said tube to displace a volume of air which is substantially equal to the volume of liquid between the level of normal fill and the bottom of the tube, said tube being of a capacity to retain the aforesaid volume of liquid whereby through the aforesaid pressure differential a column of liquid of predetermined definite height will be forced into said tube to indicate a status of acceptable fill or a state of slack fill will be evidenced by failure of the liquid to rise in the tube to said predetermined height, and light sensitive means disposed in cooperative relation to said tube for detecting the presence of a column of liquid in said tube and controlling subsequent handling of said container.

JAMES H. O'NEIL.